(12) United States Patent
Tang

(10) Patent No.: US 9,483,466 B2
(45) Date of Patent: Nov. 1, 2016

(54) TRANSLATION SYSTEM AND METHOD

(75) Inventor: Ding-Yuan Tang, Pleasanton, CA (US)

(73) Assignee: ABBYY Development LLC (RU)

( * ) Notice: Subject to any disclaimer, the term of this patent is extended or adjusted under 35 U.S.C. 154(b) by 1297 days.

(21) Appl. No.: 12/464,798

(22) Filed: May 12, 2009

(65) Prior Publication Data
US 2009/0313006 A1   Dec. 17, 2009

Related U.S. Application Data

(60) Provisional application No. 61/052,558, filed on May 12, 2008.

(51) Int. Cl.
*G06F 17/28* (2006.01)
*G06Q 10/06* (2012.01)

(52) U.S. Cl.
CPC ............. *G06F 17/289* (2013.01); *G06Q 10/06* (2013.01)

(58) Field of Classification Search
CPC ............. G06F 17/289; G06F 17/2836; G06F 3/0481; G06K 9/228
USPC .................................... 704/2, 1, 7
See application file for complete search history.

(56) References Cited

U.S. PATENT DOCUMENTS

| | | | | |
|---|---|---|---|---|
| 7,822,596 B2* | 10/2010 | Elgazzar et al. | | 704/2 |
| 7,937,261 B2* | 5/2011 | Wang et al. | | 704/2 |
| 2001/0029455 A1* | 10/2001 | Chin et al. | | 704/277 |
| 2002/0069067 A1* | 6/2002 | Klinefelter et al. | | 704/270.1 |
| 2006/0271352 A1* | 11/2006 | Nikitin et al. | | 704/9 |
| 2007/0294076 A1* | 12/2007 | Shore et al. | | 704/2 |
| 2008/0183459 A1* | 7/2008 | Simonsen et al. | | 704/1 |
| 2008/0195372 A1* | 8/2008 | Chin et al. | | 704/2 |
| 2009/0198486 A1* | 8/2009 | Chang | | 704/2 |
| 2009/0204389 A1* | 8/2009 | Wang et al. | | 704/7 |

* cited by examiner

*Primary Examiner* — Douglas Godbold
*Assistant Examiner* — Mark Villena
(74) *Attorney, Agent, or Firm* — Veronica Weinstein

(57) ABSTRACT

In accordance with a first aspect of the invention, there is provided a method comprising receiving an input as part of a translation request from a requestor, performing a first translation of the input; wherein the first translation is a machine translation, returning the first translation to the requestor; and based on feedback on the first translation from the requestor performing the following (a) fragmenting the input into multiple translation jobs, (b) distributing the multiple translation jobs to a plurality of human translators; (c) generating a second translation of the input based on translations of the multiple jobs by the human translators; and (d) returning the second translation to the requestor.

20 Claims, 4 Drawing Sheets

TRANSLATION SYSTEM AND METHOD

This application claims the benefit of priority to U.S. 61/052,558, filed May 12, 2008, the specification of which is hereby incorporated by reference.

FIELD

Embodiments of the present invention relate to a method and system for cross-cultural communication.

BACKGROUND

There are many contexts under which cross-cultural communication takes place. For example, when a person travels abroad, there is obviously a need for some cross-cultural communication. Immigration today is quite commonplace and provides another context for cross-cultural communication. Naturally, business provides yet a further context for cross-cultural communication.

With regard the business context, in order to remain competitive, businesses today are forced to operate globally. This phenomenon is known as globalization. As a result of globalization, it is not uncommon for a business to have say a sales and marketing operation in one country, an engineering and development team in a second country, and a manufacturing team in a third country. Obviously globalization leads to fragmentation of a business. However, such fragmentation is justified by cheaper labor costs, low tax rates, government incentives, access to skilled labor, etc. However, globalization is being impeded by the language barrier inherent in cross-cultural communication as often the diverse teams that make up a global business each speak a different language.

SUMMARY

In accordance with a first aspect of the invention, there is provided a method comprising receiving an input as part of a translation request from a requestor, performing a first translation of the input; wherein the first translation is a machine translation, returning the first translation to the requestor; and based on feedback on the first translation from the requestor performing the following (a) fragmenting the input into multiple translation jobs, (b) distributing the multiple translation jobs to a plurality of human translators; (c) generating a second translation of the input based on translations of the multiple jobs by the human translators; and (d) returning the second translation to the requestor.

The method may be performed by a translation system.

The translation request may be received from the requestor over a wide area network (WAN) such as the Internet.

In one embodiment, the requestor may generate the request using a client device such as a mobile phone or personal computer (PC).

Advantageously, the client device may be provisioned with software to facilitate creating and uploading the request to the translation system over the WAN. The request, in one embodiment, is to a web service implementing the method. In one embodiment, the translations may be requested via the web service using only a single click. The term "single click" is to be interpreted broadly to mean a single operation such as the selecting a "translation button" once only.

The method may include adapting the algorithms used to perform the machine translation based on analysis of the translations of the multiple jobs by the human translators.

In accordance with a second embodiment of the invention, there is provided a system comprising a request manager to receive a translation request from a requestor, the translation request comprising an input to be translated; and a translation manager comprising a machine translation server to generate a machine translation of the input based on a machine translation process; and a human translation server to generate a human translation of the input by (a) fragmenting the input into a plurality of individual translation jobs; (b) transmitting the individual translation jobs to a plurality of human translators, (c) receiving human translations of the individual translation jobs from the plurality of human translators; and (d) assembling the individual human translations into the human translation.

The system may comprise an adaptation engine to adapt the machine translation process based on the human translations.

DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
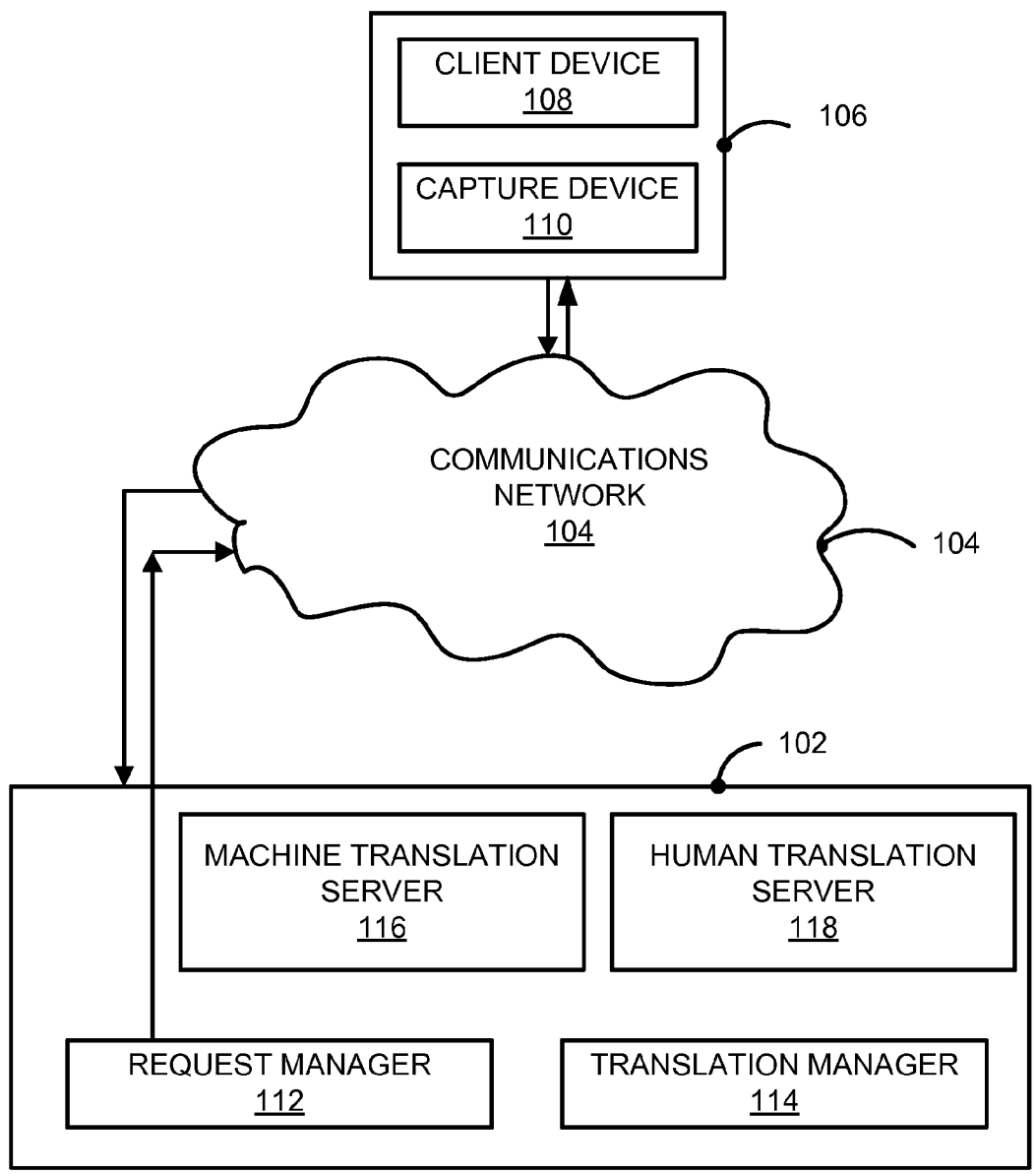
FIG. 1 shows a network architecture within which embodiments of the invention may be practiced.

Broadly, embodiments of the invention disclose a translation system and method for translating input. Typically, the input may be in the form of text in one language embodied in a translation request to translate the text into a second language. Referring to FIG. 1 of the drawings, a requestor/user (not shown) sends a translation request 100 to the translation system 102. The translation request 100 is sent via communication network 104. In accordance with embodiments of the invention, the communications network 104 may be a wide area network (WAN) such as the Internet. The request 100 is generated using a client system 106. The client system may comprise a client device 108 coupled to a separate capture device 110. For example the client device 108 may be a personal computer such as a desktop or laptop computer, and the capture device 110 may be a scanner. In this case the request 100 may comprise input in the form of a scanned image of a document to be translated. In some embodiments, the client device 108 and the capture device 110 may be integrated as in the case of a mobile phone where the capture device may be a camera of the mobile phone. In this case the request 100 may comprise input in the form of a photograph of a document to be translated. In some cases the translation request may include a photograph containing words to be translated, e.g. a photograph of a sign with the words to be translated.

Figure 3:
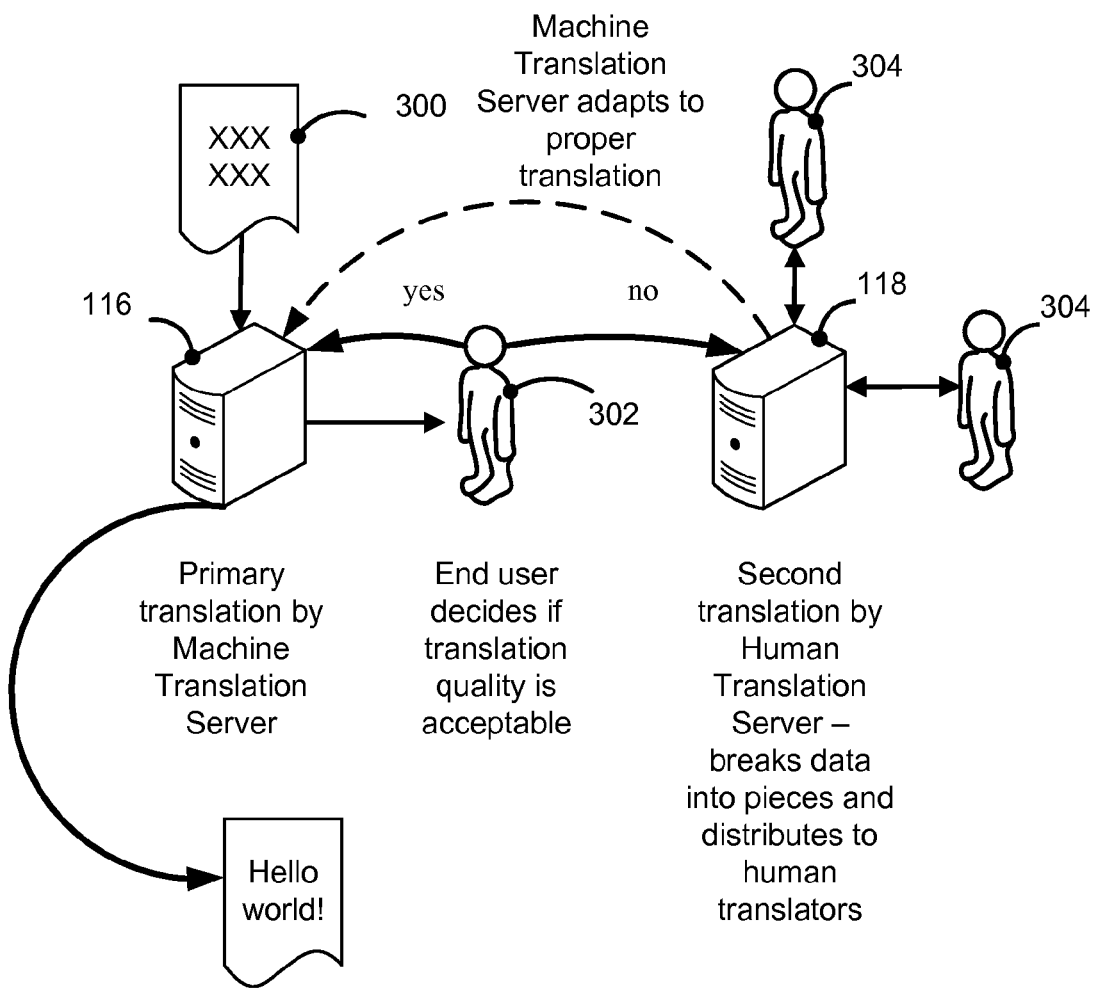
FIG. 3 shows a flowchart of a translation method, in accordance with one embodiment of the invention.

In FIG. 1, the translation system 102 is illustrated schematically in block diagram form only. In practice, one of ordinary skill in the art would understand how to architect the translation system 102 given the functionality to be described. An example of one implementation of the system 102 is shown in FIG. 3 of the drawings and is described later.

Figure 2:
FIG. 2 shows a user interface for a translation service, in accordance with one embodiment of the invention.

As will be seen, the translation system 102 comprises a request manager 112, a translation manager 114, a machine translation server 116, and a human translation server 118. The request manager 112 implements functionality whereby the request 100 may be received from the client device 108 and tracked within the translation system 102. In one embodiment, the request manager may generate a user interface (UI) which is presented to the requestor to facilitate formation of the request 100. An example of the UI is shown in FIG. 2 of the drawings. As will be seen, via the UI the user is given an option to select the type of translation required. Choices for the type of translation include an online human translation, a standard business translation, and a top quality translation. Price and turnaround time for each of the translation types are indicated. The UI 200 has fields for inputting the requestor's e-mail address, name, telephone number and any comments that the requestor wishes to add. The UI 200 also includes a "submit" button. Activation or selection of the "submit" button causes the request 100 to be formulated and transmitted via the communications network 104 to the translation system 102. Advantageously, only a single click of the "submit" button causes the request 100 to be transmitted to the translation system 102.

In one embodiment of the invention, the UI 200 is not generated by the translation system 102 as described above. Instead the UI 200 is generated by client software running on the client device 108. In one embodiment, the client software is available as a download from the translation system 102.

Upon receipt of the request 100 from the client device 108, the request manager 112 sends a request to the translation manager 114. In one embodiment, the translation manager 114 implements functionality to achieve final translation of the input contained in the request 100. There are several ways in which the translation manager 114 achieves translation of the input. For example, in one embodiment the translation manager 114 first sends the input to the machine translation server 116. The machine translation server 116 implements a machine translation process to translate the input to produce a machine translation thereof. This machine translation may be sent to the client device 108 via the request manager 112. The machine translation process may employ optical character recognition (OCR) techniques, in one embodiment. Since no human input was required to produce the machine translation, it will be appreciated that the cost of the machine translation is relatively cheap. Via the UI 200, the requester may indicate that he/she is not satisfied with the machine translation. In this case, the translation manager 114 sends the input to the human translation server 118 which then partitions or fragments the input into individual jobs. These jobs are then handed or distributed to a plurality of human translators for human translation of the individual jobs.

The translation workflow just described is illustrated in FIG. 3 of the drawings. Referring to FIG. 3 of the drawings, input 300 is subjected to primary translation by the machine translation server 116. End-user 302 decides whether the translation quality is acceptable. If the translation quality is acceptable, then the translation process is terminated. Upon termination of the translation process a back-end machine translation server 116 executes an adaptation algorithm to adapt a translation engine used to perform the machine translation process based on the satisfactory machine translation just performed.

In the case where the end-user 302 has indicated that the translation quality is unacceptable, the input 300 is fed to the human translation server 118, as can be seen in FIG. 3 of the drawings. The human translation server 118 partitions or fragments the input 300 into a plurality of individual jobs which are then distributed to human translators 304. The human translators 304 perform a secondary translation comprising a human translation of the individual jobs. The human translations corresponding to each of the individual jobs are then assembled by the human translation server 118 into a single human translation. This single human translation is delivered to the end-user 302 via the request manager 112. In one embodiment, the input 300 and the single human translation corresponding to the input 300 analyzed by the human translation server 118, and based on said analysis the machine translation engine used to perform the machine translations as described above is adapted or optimized.

Figure 4:
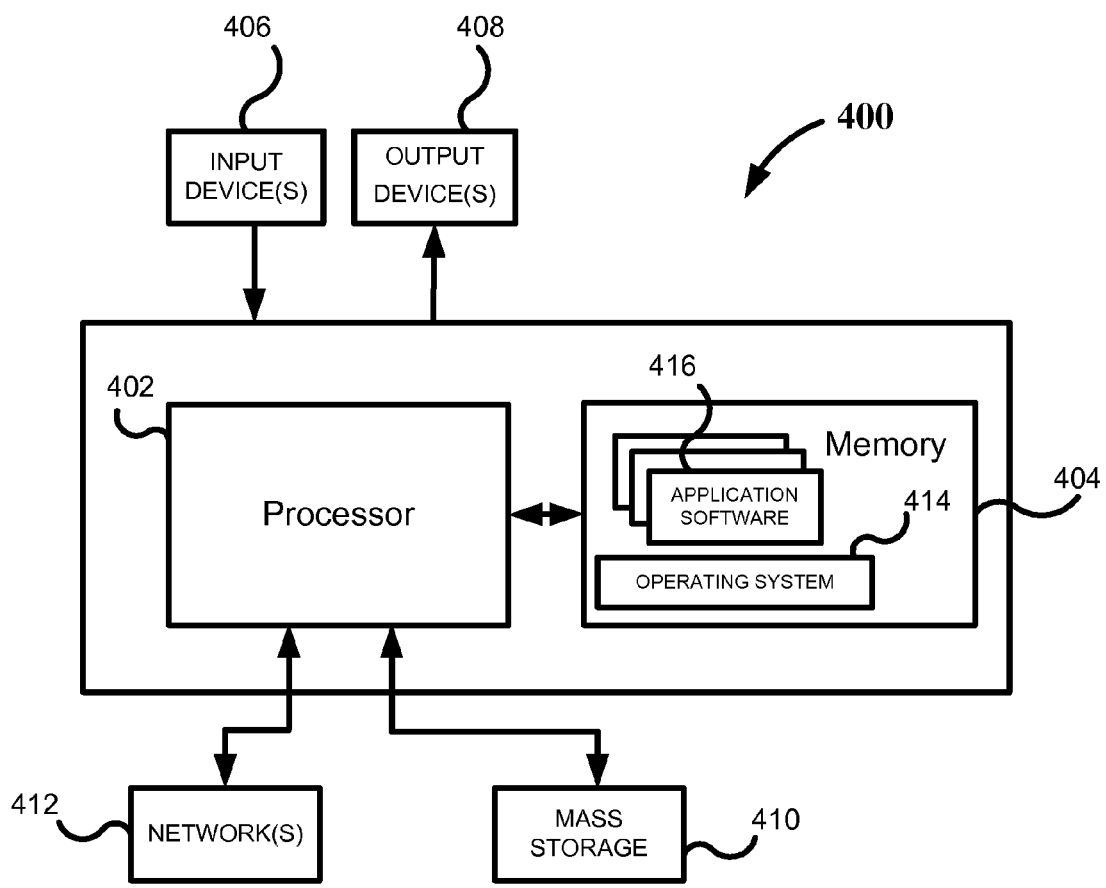
FIG. 4 shows hardware that may be used to implement a translation system, in accordance with one embodiment of the invention

It will be appreciated that the components of the translation system 102 may be implemented as a single server machine or a plurality of server machines at a single location or distributed over the WAN 104. FIG. 4 for drawings shows an example of hardware 400 that may be used to implement a translation system 102, in accordance with one embodiment of the invention. The hardware 400 typically includes at least one processor 402 coupled to a memory 404. The processor 402 may represent one or more processors (e.g., microprocessors), and the memory 404 may represent random access memory (RAM) devices comprising a main storage of the hardware 400, as well as any supplemental levels of memory e.g., cache memories, non-volatile or back-up memories (e.g. programmable or flash memories), read-only memories, etc. In addition, the memory 404 may be considered to include memory storage physically located elsewhere in the hardware 400, e.g. any cache memory in the processor 402, as well as any storage capacity used as a virtual memory, e.g., as stored on a mass storage device 410.

The hardware 400 also typically receives a number of inputs and outputs for communicating information externally. For interface with a user or operator, the hardware 400 may include one or more user input devices 406 (e.g., a keyboard, a mouse, a scanner etc.) and a display 408 (e.g., a Liquid Crystal Display (LCD) panel). For additional storage, the hardware 400 may also include one or more mass storage devices 410, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 400 may include an interface with one or more networks 412 (e.g., a local area network (LAN), a wide area network (WAN), a wireless network, and/or the Internet among others) to permit the communication of information with other computers coupled to the networks. It should be appreciated that the hardware 400 typically includes suitable analog and/or digital interfaces between the processor 402 and each of the components 404, 406, 408 and 412 as is well known in the art.

The hardware 400 operates under the control of an operating system 414, and executes various computer software applications, components, programs, objects, modules, etc. indicated collectively by reference numeral 5416 to perform the translation described above In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

What is claimed is:

1. A method for translation, the method comprising:
   by a device, receiving an input as part of a translation request from a requestor, wherein the input is an image of text captured from an image capturing component of the device;
   performing a first translation of the input, wherein the first translation is a machine translation and uses an optical character recognition (OCR) algorithm;
   returning the first translation to a display of the device for access by the requestor;
   receiving an indication from the requester that a quality of the first translation is not satisfactory; and
   providing a second translation to the requester in view of the indication that the quality of the first translation is not satisfactory, wherein providing the second translation comprises:
      providing, for display on the device, a plurality of translation options, wherein each option includes (1) a different quality of translation, (2) an indication of cost corresponding to the different quality of translation, and (3) an indication of estimation of turnaround time for the different quality of translation;
      receiving, from the requester, an indication of selection of one of the plurality of translation options, wherein the selected option includes (1) a different quality of translation, (2) an indication of cost corresponding to the different quality of translation, and (3) an indication of estimation of turnaround time for the different quality of translation;
   fragmenting the input into multiple translation jobs based on the selected option;
   distributing the multiple translation jobs to a translation system comprising a plurality of devices for human translators;
   generating the second translation of the input based on translations of the multiple jobs by the human translators; and
   providing the second translation to the requestor.

2. The method of claim 1, wherein the translation request is received from the requestor over a wide area network (WAN).

3. The method of claim 2, further comprising provisioning the device with software to facilitate creating and uploading the translation request to the translation system over the WAN.

4. The method of claim 1, wherein the device is a mobile phone.

5. The method of claim 1, further comprising adapting algorithms used to perform the machine translation based on analysis of the translations of the multiple jobs by the human translators.

6. The method of claim 1, wherein the image of text is a scanned image of a document.

7. The method of claim 1, wherein receiving the input includes receiving a photograph containing words to be translated.

8. The method of claim 1, wherein the requestor is a device.

9. The method of claim 1, wherein the method further comprises performing an optical character recognition function on the image of text to performing the first translation of the input.

10. A system comprising:
   a request manager configured (1) to receive a translation request from a requestor, the translation request comprising an image to be translated, and (2) to return a first translation to a display of a device for access by the requestor;
   a translation manager comprising a machine translation server to generate a machine translation of the image based on a machine translation process and an optical character recognition (OCR) algorithm, and wherein the machine translation is the first translation; and
   a human translation server to generate a human translation of the machine translation by:
      receiving an indication from the requester that a quality of the first translation is not satisfactory; and
      providing a second translation to the requester in view of the indication that the quality of the first translation is not satisfactory, wherein providing the second translation comprises:
         providing user interface elements corresponding to a plurality of translation options for display on a user interface each of the user interface elements including (1) a different quality of translation, (2) an indication of cost corresponding to the different quality of translation options, and (3) an indication of estimation of turnaround time for the different quality of translation;
         receiving, from the requester, an indication of selection of one of the plurality of translation options wherein the selected option includes: (1) a different quality of translation, (2) an indication of cost corresponding to the different quality of translation, and (3) an indication of estimation of turnaround time for the different quality of translation;
fragmenting the machine translation into a plurality of individual translation jobs based on the selected option;
transmitting the individual translation jobs to a plurality of devices for human translators;
receiving human translations of the individual translation jobs from the plurality of devices for human translators; and
assembling the individual translations into the human translation.

11. The system of claim 10, further comprising an adaptation engine to adapt the machine translation process based on the human translations.

12. A client device comprising:
a processor; and
a memory coupled to the processor, the memory storing instructions which when executed by the processor causes the client device to perform a method comprising:
initiating a communication with a translation service;
generating a translation request for the translation service, wherein the translation request comprises an image of input text;
sending the translation request to the translation service;
receiving a machine translation from the translation service of the input text, wherein the machine translation uses an optical character recognition (OCR) algorithm;
sending feedback related to the machine translation to the translation service;
receiving a plurality of translation options for a second translation after sending the feedback, wherein each of the plurality of translation options includes to (1) a different quality of translation for the input text, (2) an indication of cost corresponding to the different quality of translation, and (3) an indication of estimation of turnaround time for the different quality of translation of the input text;
sending a second translation request including an indication of selection of one of the plurality of translation options for the second translation; and
receiving the second translation of the input text, wherein the second translation is translated according to the selection.

13. The client device of claim 12, wherein the translation request is generated and sent to the translation service using a single click operation, wherein the single click operation comprises selecting a translation button once only.

14. The client device of claim 12, which comprises a mobile phone.

15. The client device of claim 12, wherein the translation service is a web-based translation service.

16. A non-transitory computer-readable storage medium having stored thereon a sequence of instructions which when executed by a system causes the system to perform a method comprising:

receiving an input as part of a translation request from a requestor, wherein the input comprises an image of text;
performing a first translation of the input, wherein the first translation is a machine translation, wherein the machine translation uses an optical character recognition (OCR) algorithm;
returning the first translation to the requestor;
receiving an indication from the requester that a quality of the first translation is not satisfactory; and
providing a second translation to the requester in view of the indication that the quality of the first translation is not satisfactory, wherein providing the second translation comprises:
providing user interface elements on a user interface, each of the user interface elements corresponding to one of a plurality of translation options including (1) a different quality of translation, (2) an indication of cost corresponding to the different quality of translation options, and (3) an indication of estimation of turnaround time for the different quality of translation;
receiving, from the requester, an indication of selection of one of the plurality of translation options wherein the selected option includes: (1) a different quality of translation, (2) an indication of cost corresponding to the different quality of translation, and (3) an indication of estimation of turnaround time for the different quality of translation;
fragmenting the input into multiple translation jobs based on the selected option;
distributing the multiple translation jobs to a translation system comprising a plurality of human translators;
generating a second translation of the input based on translations of the multiple jobs by the human translators; and
returning the second translation to the requestor.

17. The non-transitory computer-readable storage medium of claim 16, wherein the translation request is received over a wide area network (WAN).

18. The non-transitory computer-readable storage medium of claim 17, wherein the translation request is generated using a mobile phone.

19. The non-transitory computer-readable storage medium of claim 18, wherein the method further comprises provisioning the mobile phone with software to facilitate creating and uploading the translation request to the translation system over the WAN.

20. The non-transitory computer-readable storage medium of claim 16, wherein the method further comprises adapting algorithms used to perform the machine translation based on analysis of the translations of the multiple jobs by the human translators.

* * * * *